United States Patent [19]

Nakamura et al.

[11] Patent Number: 5,273,146
[45] Date of Patent: Dec. 28, 1993

[54] BEARING UNIT FOR CLUTCH RELEASE

[75] Inventors: Takeshi Nakamura; Hiroyoshi Sasage, both of Kanagawa, Japan

[73] Assignee: NSK Ltd., Tokyo, Japan

[21] Appl. No.: 35,905

[22] Filed: Mar. 23, 1993

Related U.S. Application Data

[63] Continuation of Ser. No. 864,602, Apr. 7, 1992, abandoned.

[30] Foreign Application Priority Data

Apr. 9, 1991 [JP] Japan .................. 3-103378

[51] Int. Cl.⁵ .............................................. F16D 23/14
[52] U.S. Cl. .................... 192/98; 192/110 B
[58] Field of Search .................. 192/98, 110 B, 70.13, 192/89 PH, 89 PL

[56] References Cited

U.S. PATENT DOCUMENTS

| | | | |
|---|---|---|---|
| 4,186,828 | 2/1980 | Renaud | 192/98 |
| 4,529,075 | 7/1985 | Renaud | 192/98 |
| 4,529,076 | 7/1985 | Renaud | 192/110 B X |
| 4,601,379 | 7/1986 | Renaud et al. | 192/98 X |
| 4,611,700 | 9/1986 | Despres | 192/98 |
| 4,733,764 | 3/1988 | Corral et al. | 192/98 |
| 4,863,005 | 9/1989 | Parzefall | 192/98 |
| 5,012,911 | 5/1991 | Kabayama | 192/98 X |

FOREIGN PATENT DOCUMENTS 0320365 6/1989 European Pat. Off. ........ 192/110 B
1-171928 12/1989 Japan .
1-171929 12/1989 Japan .
2-84021 6/1990 Japan .

*Primary Examiner*—Rodney H. Bonck
*Attorney, Agent, or Firm*—Sughrue, Mion, Zinn, Macpeak & Seas

[57] ABSTRACT

A bearing unit for a clutch release comprising a sleeve, a support plate, a ring, a bearing and a cover. The sleeve surrounds a motive power shaft and is movable along the shaft. The support plate extends from the sleeve outward in the radial direction of the shaft. The ring has a cylindrically-shaped holding portion fitted with a clutch release bearing and has an axis extending in the axial direction of the shaft and engagement portions with which a clutch releasing fork is engaged as the fork is swung toward the shaft. The bearing, at least the outer race of which is housed in the holding portion so as to have an axis in the axial direction of the shaft, is fitted on the inner circumferential surface of the holding portion so as to be movable in the radial direction of the shaft inside the holding portion. The outer race is pinched at both the end faces thereof between the holding portion and one side of the support plate along the axis of the shaft so that the ring, the bearing and the plate are assembled. The cover covers the outer surface of the holding portion, the outer circumferential surface of the plate and the outer circumferential edge portion of the other side of the plate, and coupling the ring, the bearing and the plate together so that the ring and the plate are unmovable relative to each other in the axial and radial directions of the shaft.

9 Claims, 6 Drawing Sheets

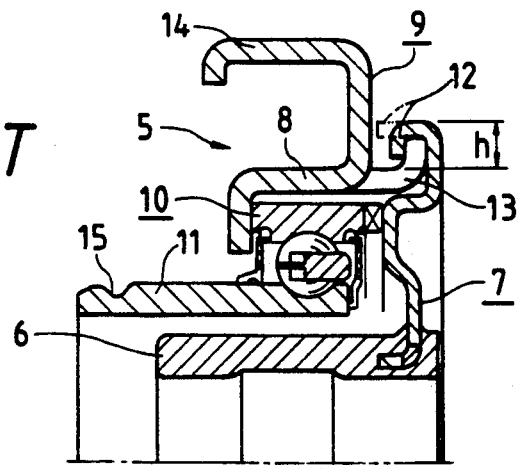
FIG. 14
PRIOR ART
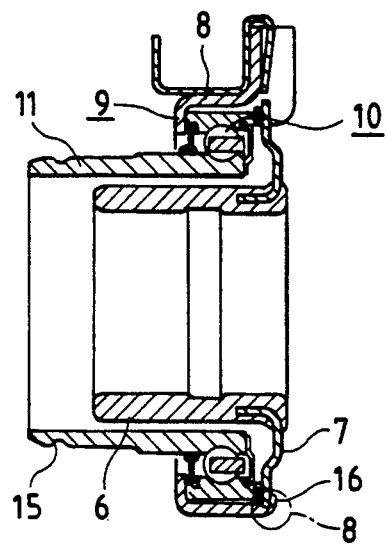
FIG. 15
PRIOR ART
FIG. 16
PRIOR ART
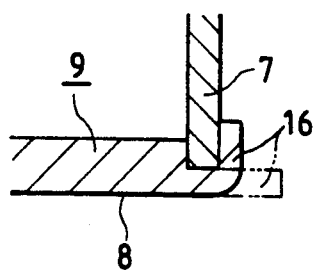
FIG. 17
PRIOR ART
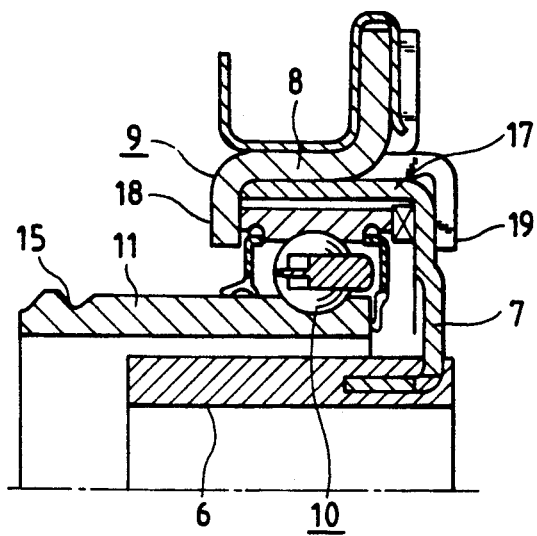

BEARING UNIT FOR CLUTCH RELEASE

This is a continuation of application No. 07/864,602 filed Apr. 7, 1992, and now abandoned.

BACKGROUND OF THE INVENTION

The present invention relates to a bearing unit which is included in the clutch mechanism of a motor vehicle having a manual transmission and is for releasing a clutch. The present invention more particularly related to a bearing unit which is included in the pull-type clutch mechanism of a motor vehicle having a manual transmission and pulls the central portion of a diaphragm spring to release a clutch at the time of manipulating the transmission to change the speed of the vehicle.

A clutch mechanism provided at the manual transmission of a motor vehicle includes a flywheel which is rotated together with the crankshaft of the engine of the vehicle; a clutch disk facing the flywheel; a pressure plate for pushing the disk toward the flywheel; a diaphragm spring for pushing the pressure plate toward the clutch disk; and a bearing unit which can be moved along a motive power shaft to change the angle of the inclination of the diaphragm spring to engage or disengage the flywheel and the clutch disk with or from each other. Many of conventional such clutch mechanisms are of the push type in which the central portion of the diaphragm spring is pushed to release a clutch in such a manner that the flywheel and the clutch disk are separated from each other to keep the torque of the crankshaft from being transmitted to the transmission through the motive power shaft.

When the clutch of the push-type clutch mechanism is to be engaged to transmit the torque of the crankshaft to the manual transmission through the motive power shaft, the clutch disk 3 is pushed onto the flywheel with the pressure plate 2 by the elastic force of the diaphragm spring 1 as shown in FIG. 10. When the clutch is to be released to keep the torque of the crankshaft from being transmitted to the manual transmission through the motive power shaft at the time of manipulating the transmission to change the speed of the vehicle, the central portion of the diaphragm spring 1 is pushed down (as to FIG. 10) toward the flywheel by the bearing unit so that the angle of the inclination- of the spring is changed, as shown in FIG. 11, to cause the pressure plate 2 to stop pushing the clutch disk 3.

On the other hand, a pull-type clutch mechanism includes a diaphragm spring 1 of larger leverage and a less deformed clutch cover 4 than the push-type clutch mechanism, and transmits higher motive power than the push-type one. The pull-type clutch mechanism has recently been used for a heavy vehicle or the like in the main. When the clutch of the pull-type clutch mechanism is to be engaged to transmit the torque of the engine of a motor vehicle through a motive power shaft, a clutch disk 3 is pushed onto a flywheel with a pressure plate 2 by the elastic force of the diaphragm spring 1 similarly to the push-type clutch mechanism, as shown in FIG. 12. When the clutch is to be released to keep the torque of the engine from being transmitted to the manual transmission through the shaft at the time of manipulating the transmission to change the speed of the vehicle, the central portion of the diaphragm spring 1 is pushed up (as to FIG. 12) away from the flywheel by a clutch release bearing unit so that the angle of the inclination of the diaphragm spring is changed, as shown in FIG. 13, to cause the pressure plate 2 to stop pushing the clutch disk 3.

FIG. 14 shows the constitution of the conventional bearing unit 5 of the pull-type clutch mechanism. The bearing unit 5 comprises a sleeve 6 movable along the guide shaft or front cover of the clutch mechanism; a support plate 7 which is an annular metal plate secured to the outer circumferential surface of the sleeve; a ring 9 secured to the peripheral portion of the support plate and having a holding portion 8 shaped as a short cylinder; a clutch release bearing 10 fitted in the holding portion; and an operating cylinder 11 rotatably supported by the bearing in order to pull the central portion of the diaphragm spring 1. The peripheral portion 12 of the support plate 7 is bent back so as to hold the bent outer portions 13 of the ring 19 at one end thereof in such a manner that the plate and the ring are coupled to each other. The ring 9 has engagement portions 14 located opposite each other in the diametral direction of the ring. The tip portions of the arms of the clutch releasing fork of the clutch mechanism are engaged with the engagement portions 104 of the ring 9 along with the swing of the fork so as to pull the clutch release bearing 10 rightward as to FIG. 14. The inner circumferential edge portion of the pull plate of the clutch mechanism is fitted in the recess 15 of the outer circumferential surface of the end portion of the operating cylinder 11 and the pull plate faces the inner circumferential edge portion of the diaphragm spring 1 so that the plate pulls the central portion of the spring as the operating cylinder is moved.

Since the bent-back peripheral portion 12 of the support plate 7 of the conventional bearing-g unit 5 is engaged with the bent outer portions 13 of the ring 9 of the unit in order to couple the support plate and the ring to each other, the joint of both the plate and the ring projects by a length h outward from the outer circumferential surface of the body of the ring, as shown in FIG. 14. For that reason, many components of the clutch mechanism need to be located at relatively large distances from the bearing unit 5 in order to prevent the joint from interfering with the components. As a result, the degree of freedom of the design of the clutch mechanism is lowered. Since the bent-back peripheral portion 12 of the metal plate 7 is bent twice, high residual stress is caused in the portion to make it likely to undergo a crack in the long-period use of the portion.

To solve these problems, arts were developed as disclosed in Japan Utility Model Application (OPI) No. 2-84021 (the term "OPI" as used herein means an "unexamined published application"). In one of the arts, the outer end portion of the ring 9 of a bearing unit is provided with a thin part 16, the outer circumferential edge portion of the support plate 7 of the unit is fitted on the inner surface of the thin part, and the projecting portion of the thin part, which projects from the support plate outward along the axis of the ring, is bent inward in the radial direction of the ring to couple the plate and the ring to each other, as shown in FIGS. 15 and 16. In the other of the arts, the outer circumferential portion of the support plate 7 of a bearing unit is provided with a cylindrical part 17, the part is butted at the end thereof to the inner surface of one inwardly bent end portion 18 of the ring 9 of the unit, and the other end portion 19 of the ring, which projects from the cylindrical part outward along the axis of the ring, is also bent inward in the radial direction thereof to pinch the cylindrical part between both the inwardly bent end portions to couple the support plate and the ring to each other, as shown in FIG. 17. However, since the support plate 7 and the ring 9 are coupled to each other by bending the ring in each of the arts, the ring needs to be made of a bendable relatively soft material not subjected to quenching or the like and is therefore likely not to be high enough in strength. Since a strong force larger than the elastic force of a diaphragm spring is applied to the ring 9 by a releasing force to release a clutch, the ring needs to be high enough in flexural strength. If the ring 9 is made of the relatively-soft material, it is difficult to render the ring high enough in flexural strength. For that reason, it is hard to use the ring 9 of such a soft material for a heavy vehicle having a diaphragm spring of strong elastic force. Although it is conceivable to subject the to-be-bent portion of the ring 9 to a carbon blocking treatment and thereafter quench the other portion thereof to make it possible to render the ring high enough in strength and bend the former portion, the processing of the ring is troublesome and the cost of manufacturing thereof is high.

SUMMARY OF THE INVENTION

The present invention was made in order to solve the above-described problems.

Accordingly, it is an object of the present invention to provide a bearing unit which is for a clutch release, and includes a sleeve surrounding a motive power shaft and movable along it, a support plate which is annularly shaped and is secured to the peripheral portion of the sleeve, a ring having a cylindrically-shaped holding portion and secured to the outer circumferential edge portion of the support plate, and a clutch release bearing fitted in the holding portion of the ring. The bearing unit is characterized by including a cover which has a main portion secured to the outer surface of the holding portion of the ring, and holding portions projecting from the end of the main portion, and is disposed in such a manner that the outer circumferential edge of the support plate is fitted on the inner surfaces of the holding portions of the cover, and the parts of the holding portions, which project from the outer surface of the support plate, are bent inward in the radial direction thereof to couple the ring and the support plate by the cover. The central portion of a diaphragm spring is displaced by the bearing unit to change the angle of the inclination of the spring to disengage or engage the clutch.

Since the joints of both the support plate and the ring do not project outward from the outer circumferential surface of the ring, the bearing unit is less likely to interfere with the other components of a clutch mechanism. For that reason, the degree of freedom of the design of the clutch mechanism is heightened. Since the ring is made of a hardened material as a whole, the ring is prevented from being deformed in use and the strength of the ring is high enough to make it possible to use the bearing unit for a heavy vehicle having an engine of high output power and a diaphragm spring of strong elastic force.

DESCRIPTION OF THE DRAWINGS

FIG. 14 is a partial sectional view of a conventional bearing unit for clutch release;
FIG. 15 is a partial sectional view of another conventional bearing unit for clutch release;
FIG. 16 is an enlarged sectional view of a part B of the bearing unit shown in FIG. 15;
and
FIG. 17 is a partial sectional view of yet another bearing unit for clutch release.

DETAILED DESCRIPTION OF THE PREFERRED EMBODIMENTS

Figure 1:
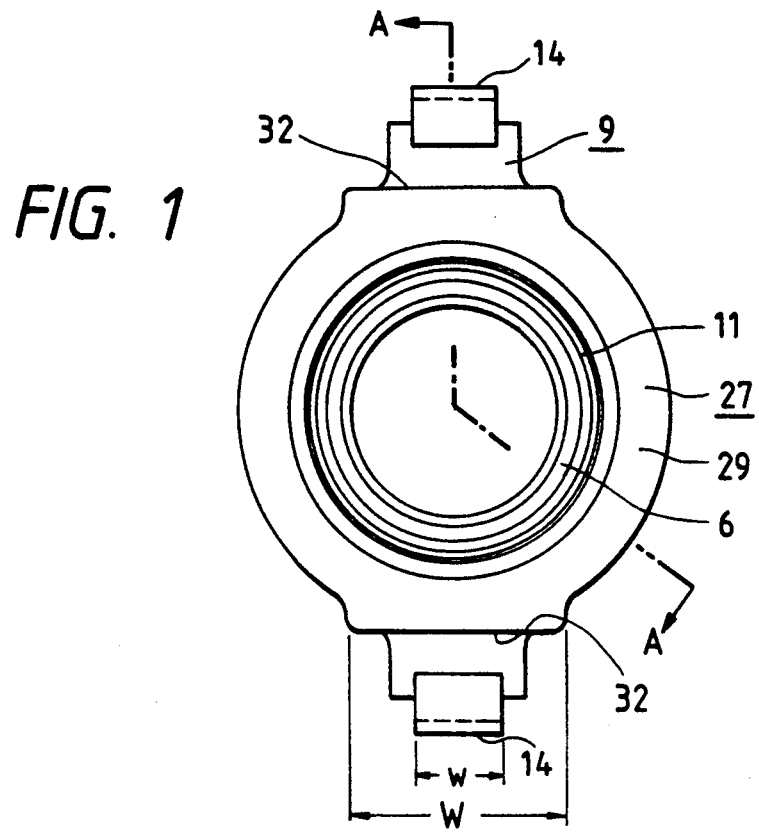
FIG. 1 is a front view of a bearing unit which is an embodiment of the present invention.
Figure 2:
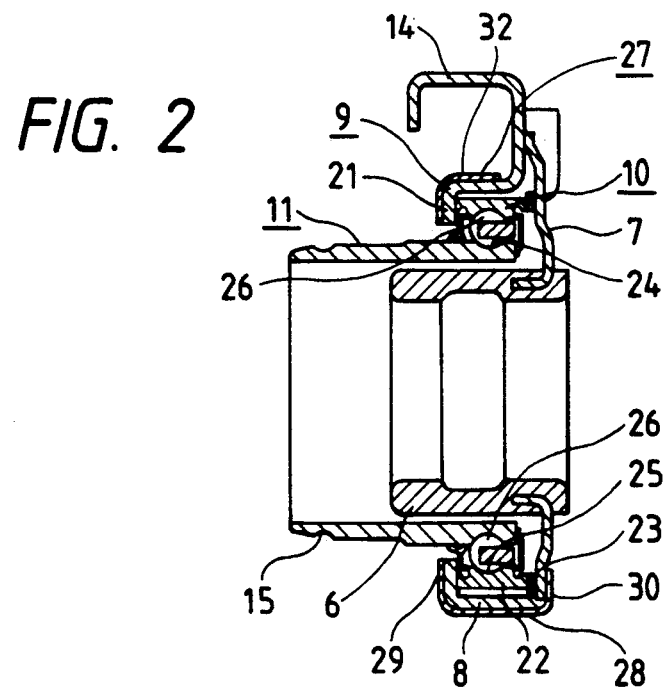
FIG. 2 is a sectional view of the unit along lines A.
Figure 3:
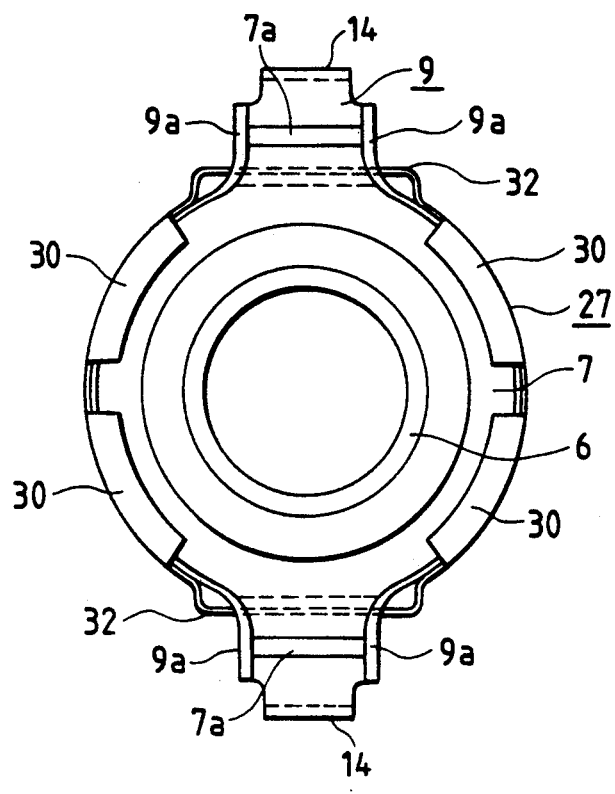
FIG. 3 is a rear view of the unit.
Figure 4:
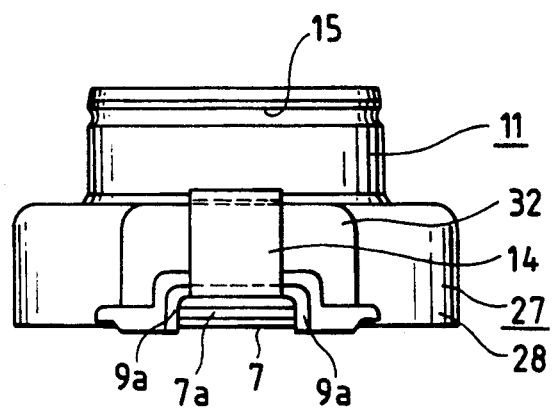
FIG. 4 is a plan view of the unit.

Embodiments of the present invention are hereafter described in detail with reference to the drawings attached hereto.

FIGS. 1, 2, 3 and 4 show a bearing unit which is one of the embodiments and is for the clutch release of a motor vehicle. The bearing unit comprises a sleeve 6, a support plate 7, a ring 9, a clutch release bearing 10, an operating cylinder 11, an automatic centering corrugated leaf spring 23, and a cover 27.

The sleeve 6 is cylindrically formed of a slippery synthetic resin as a whole, and is movable along the guide shaft or front cover of a clutch mechanism including the bearing unit and the clutch. The support plate 7 is an annular metal plate. When the sleeve 6 is formed of the resin, the inner circumferential edge portion of the support plate 7 is embedded in the sleeve so as to be secured thereto. The ring 9 is made of a steel plate hardened by a cementation and nitriding treatment or the like and secured to the outer circumferential edge portion of the support plate 7, and has a holding portion 8 shaped as a short cylinder, and an end portion 21 bent inward in the radial direction of the ring. The outer circumferential edge portion of the support plate 7 has projections 7a between the side portions 9a of the lobes of the ring 9 so that the support plate is prevented from rotating relative to the ring. The outer race 22 of the bearing 10 is supported between the inner surface of the support plate 7 and that of the inwardly bent end portion 21 of the ring 9. The operating cylinder 11 constitutes the inner race of the bearing 10, and is for pulling the central portion of the diaphragm spring of the clutch mechanism. The bearing 10 is a deep-grooved ball bearing, and includes the inner race 11, the outer race 22, an inner groove 24 provided in the outer circumferential surface of the end portion of the inner race, an outer groove 25 provided in the inner circumferential surface of the outer race, and a plurality of balls 26 fitted in the grooves between the races. The operating cylinder 11 is rotatably supported inside the ring 9. The inner circumferential edge portion of the pull plate of the clutch mechanism is fitted in the groove 15 of the outer circumferential surface of the other end portion of the operating cylinder 11 so that the central portion of the diaphragm spring can be pulled with the pull plate and the bearing unit. The automatic centering corrugated leaf spring 23 is pinched between the support plate 7 and the end facet of the outer race 22.

Figure 5:
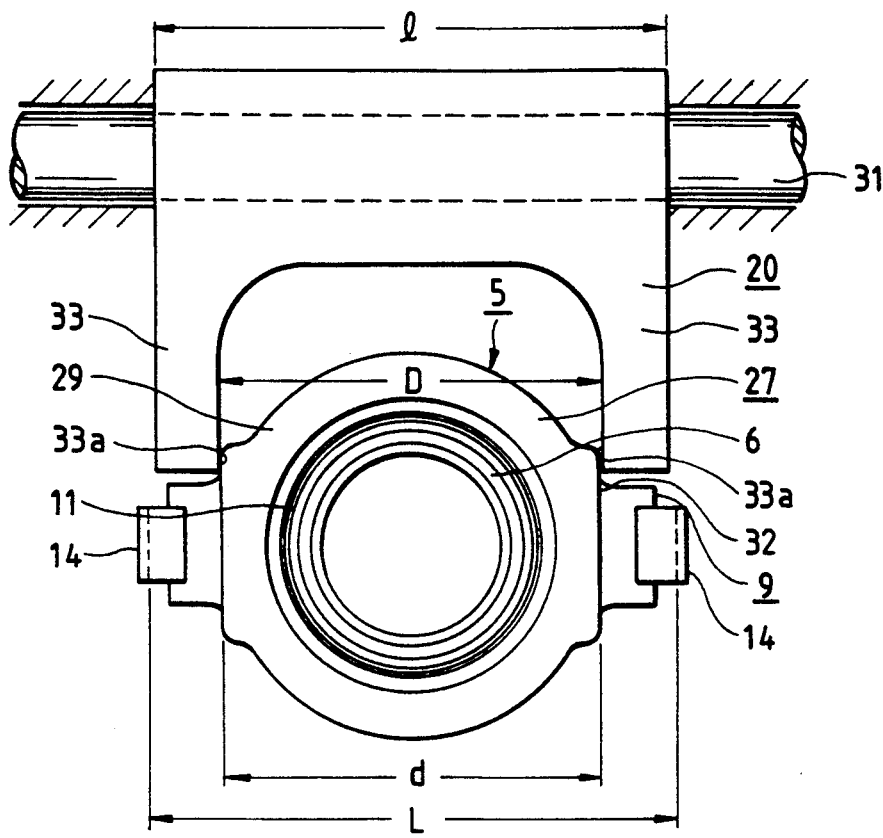
FIG. 5 is a front view of the unit to illustrate engaging a clutch releasing fork with the bearing unit.

The cover 27 covers the ring 9, and couples the ring and the support plate 7 to each other. The cover 27 is made of a relatively soft steel plate smaller in thickness than the ring 9 and treated in a softnitriding process such as TUFFTRIDE ® process, a TOUGH NITE ® process or the like. The cover 27 is secured to the outer surface of the holding portion 8 of the ring 9. The cover 27 includes a cylindrical main portion 28 fitted on the outer surface of the holding portion 8 of the ring 9, a bent portion 29 extending from the end of the main portion and located in contact with the outer surface of the inwardly bent end portion 21 of the ring, and a plurality of holding portions 30 extending from the other end of the main portion. The support plate 7 is fitted on the inner surfaces of the holding portions 30 of the cover 27. The projecting parts of the holding portions 30, which project from the support plate 7 along the axis thereof, are bent inward in the radial direction of the ring 9 so that the support plate and the ring are coupled to each other by the cover 27. The main portion 28 of the cover 27 has planes 32 parallel with each other and facing the engagement portions 14 of the ring 9 opposite each other in the diametral direction thereof. The length W of each of the planes 32 is much larger than that W of each of the engagement portion 14. The distance d between the planes 32 is slightly smaller than that D between the inner surfaces of the tip portions of the arms 33 of the clutch releasing fork 20 of the clutch mechanism, and the distance L between the inner surfaces of the engagement portions 14 is slightly larger than that between the outer surfaces of the tip portions of the arms, as shown in FIG. 5, so that the tip portions of the arms can be inserted in between the inner surfaces of the engagement portions and the planes.

Figure 6:
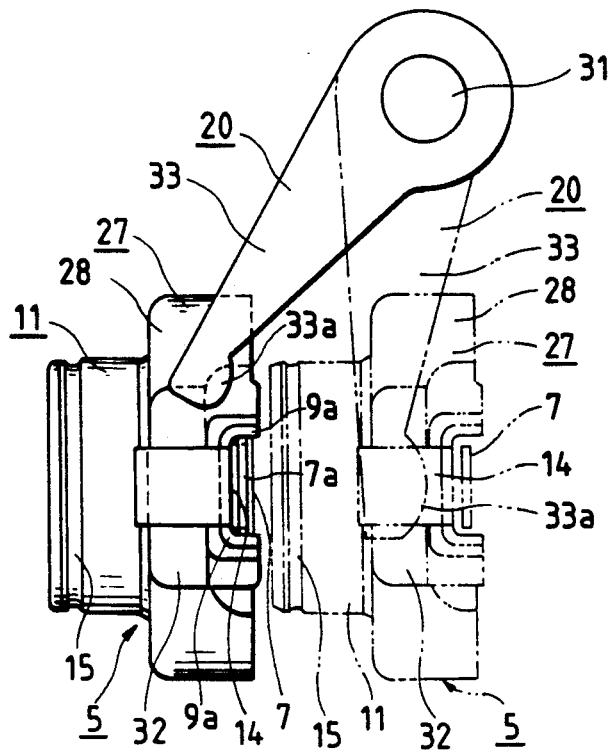
FIG. 6 is a side view of the unit to illustrate the engaging.
Figure 13:
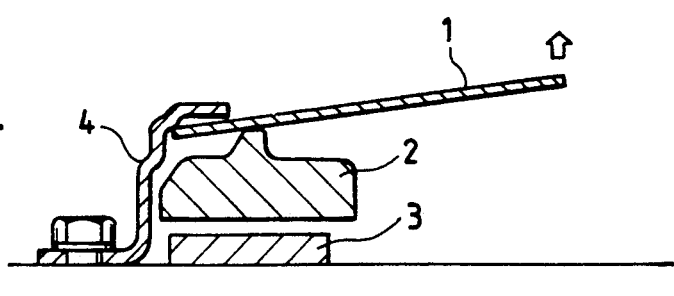
FIG. 13 is a partial sectional view of the pull-type clutch mechanism to illustrate the constitution and operation thereof in the state of clutch disengagement.

When the bearing unit is installed in the clutch mechanism, the pull plate is engaged with the end portion of the operating cylinder 11 to face the inner circumferential edge portion of the diaphragm spring and the tip portions of the arms 33 of the clutch releasing fork 20 are put in between the planes 32 and the inner surfaces of the engagement portions 14. To release the clutch through the use of the bearing unit, the fork 20 is swung, as shown in FIG. 6, to pull the central portion of the diaphragm spring with the pull plate to separate a clutch disk and a flywheel from each other. The clutch can thus be disengaged and engaged through the use of the bearing unit in the same manner as the conventional clutch mechanism shown in FIG. 13.

Since the joints of both the support plate 7 and the ring 9, which are formed by bending the holding portions 30 of the cover 27 inward in the radial direction of the ring as mentioned above, do not project outward from the outer circumferential surface of the ring, the bearing unit is less likely to interfere with the other components of the clutch mechanism. For that reason, the bearing unit can be located nearer the other components, and the degree of freedom of the design of the clutch mechanism is heightened. Since the holding portions 30 are bent only once, high residual stress is not caused in them at the joints. Therefore, the durability of the holding portions 30 is increased to enhance the reliability of the bearing unit. Since the cover 27 having the holding portions 30 is manufactured separately from the ring 9 so that the ring does not need to be bent to be coupled to the support plate 7, the ring can be made of a hard material so as to be surely prevented from being deformed when the clutch is manipulated with the bearing unit to change the speed of the motor vehicle. For that reason, the bearing unit is high enough in durability and reliability even for a vehicle having an engine of high output power and a diaphragm spring of strong elastic force.

Since the main portion 28 of the cover 27 has the planes 32 each having the length W, the tip portions of the arms 33 of the fork 20 can be smoothly engaged with and disengaged from the engagement portions 14 of the ring 9. For either of the engagement and the disengagement, the bearing unit 5 is moved between its positions shown by full lines and two-dot chain lines in FIG. 6, while the fork 20 is swung between its positions shown by full lines and two-dot chain lines in FIG. 6. At that time, the position of a shaft 31 supporting the fork 20 remains unchanged. For example, in order to engage the tip portions of the arms 33 of the fork 20 with the engagement portions 14 of the ring 9, the bearing unit 5 fitted on a shaft not shown in the drawings and the clutch releasing fork 20 are first put in the positions shown by the full lines in FIG. 6, and the bearing unit is then moved on the shaft rightward as to FIG. 6 while the fork is swung counterclockwise as to FIG. 6. When the bearing unit 5 is thus moved and the fork 20 is thus swung, the inner surfaces 33a of the tip portions of the arms 33 of the fork first come into contact with the planes 32 of the cover 27 and then become engaged with them so that the bearing unit is prevented from rotating about the shaft. When the movement of the bearing unit 5 and the swing of the fork 20 are completed, the tip portions of the arms 33 of the fork are engaged with the engagement portions 14 of the ring 9 as shown by the two-dot chain lines in FIG. 6 In order to disengage the tip portions of the arms 33 of the fork 20 from the engagement portions 14 of the ring 9, the bearing unit 5 is moved leftward as to FIG. 6 from the position shown by the two-dot chain lines therein, while the fork is swung clockwise as to FIG. 6 from the position shown by the two-dot chain lines therein. The tip portions of the arms 33 can thus be smoothly disengaged from the engagement portions 14 as shown by the full lines in FIG. 6. Since the main portions 28 of the cover 27 has the planes 32 each having the sufficiently large length W, the bearing unit 5 is prevented from rotating about the shaft while the tip portions of the arms 33 of the fork 20 are located inside the engagement portions 14 of the ring 9. As a result, the tip portions of the arms 33 are prevented from catching on the inner surfaces of the engagement portions 14 or the planes 32. For that reason, the tip portions of the arms 33 can be smoothly engaged with and disengaged from the engagement portions 14 of the ring 9.

Figure 7:
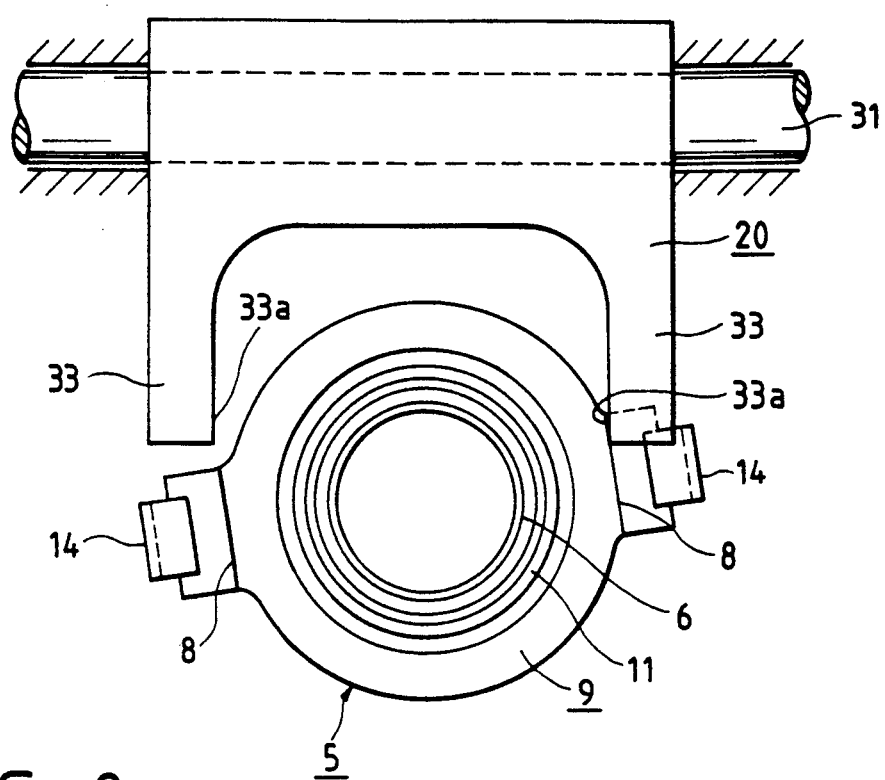
FIG. 7 is a front view Of the unit to illustrate engaging a clutch releasing fork with a conventional bearing unit.

The reason why each of the planes 32 of the cover 27 can be made large enough in length is that the cover is made of the relatively soft metal plate separately from the ring 9. If the ring 9 were formed with the planes as in a conventional bearing unit, it would be difficult to make the length of each of the planes large enough, because the ring is made of the hard metal plate. If the length of each of the planes 32 were not large enough, the bearing unit 5 would be allowed to rotate about the shaft, as shown in FIG. 7, while the tip portions of the arms 33 of the fork 20 were located inside the engagement portions 14 of the ring 9. In that case, the tip portions of the arms 33 would be likely to catch on the inner surfaces of the engagement portions 14 or the planes 32 to make it impossible to smoothly engage and disengage the tip portions with and from the engagement portions.

Figure 8:
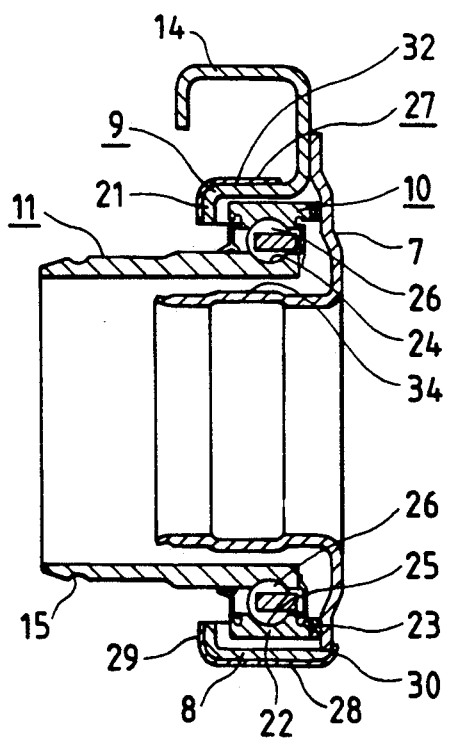
FIG. 8 is a sectional view of a bearing unit which is another embodiment of the present invention.
Figure 9:
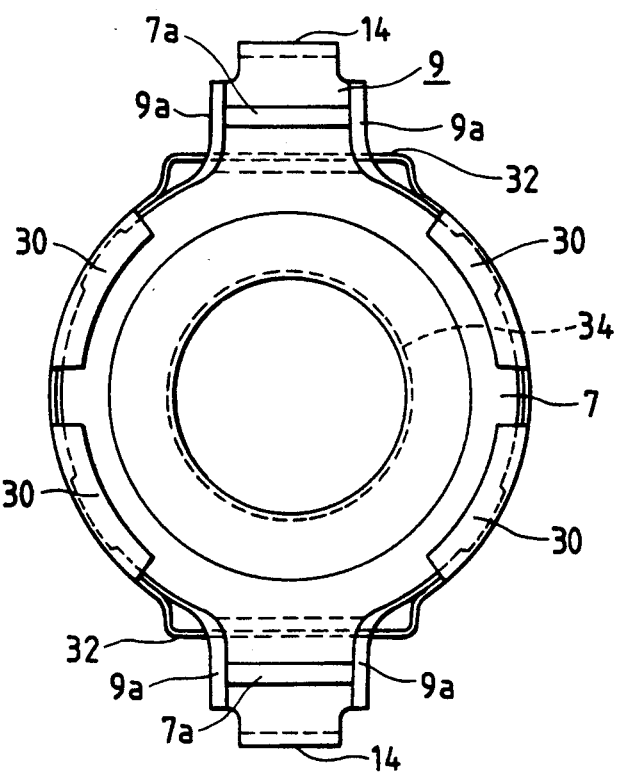
FIG. 9 is a rear view of the unit shown in FIG. 8.
Figure 10:
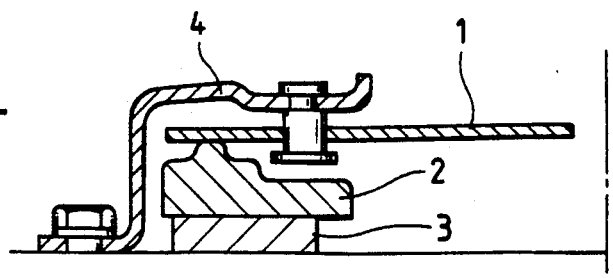
FIG. 10 is a partial sectional view of a push-type clutch mechanism to illustrate the constitution and operation thereof in the s of clutch engagement.
Figure 11:
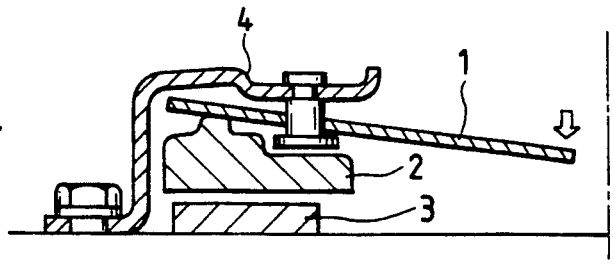
FIG. 11 is a partial sectional view of the mechanism to illustrate the constitution and operation thereof in the state of clutch disengagement.
Figure 12:
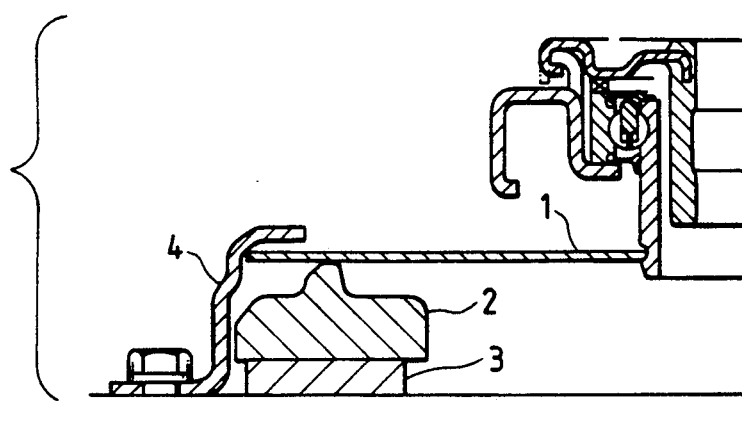
FIG. 12 is a partial sectional view of a pull-type clutch mechanism to illustrate the constitution and operation thereof in the state of clutch engagement.

FIGS. 8 and 9 show a bearing unit which is another of the embodiments and is for the clutch release of a motor vehicle. Although the inner circumferential edge portion of the support plate 7 of the preceding embodiment is embedded in the sleeve 6 made of the synthetic resin, the support plate 7 of the other embodiment has an inner circumferential edge portion and a cylindrical portion 34 formed integrally with the former portion and slidably fitted on a shaft and such a sleeve is not provided in the latter embodiment. In the other respects, the embodiments are the same.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A bearing unit for a clutch release comprising;
    a sleeve (6) into which a motive power shaft is inserted, said sleeve being movable along said shaft;
    a support plate (7) extending from said sleeve outward in the radial direction of said shaft;
    a ring (9) having a cylindrically-shaped holding portion (21) for holding a clutch release bearing (10) and having an axis extending in the axial direction of said shaft, and engagement portions (14) with which a clutch releasing fork (20) is engaged as said fork is swung along an axis of said shaft;
    said bearing (10) having at least an outer race which is housed in said holding portion so as to have an axis in the axial direction of said shaft and which is fitted loosely on the inner circumferential surface of said holding portion so as to be movable in the radial direction of said shaft inside said holding portion, said outer race being pinched at both end facets thereof between sad holding portion and one side of said support plate along the axis of said shaft so that said ring, said bearing and said plate are assembled; and
    a cover (27) covering the outer surface of said holding portion and the face of the other side of said plate, and coupling said ring, said bearing and said plate together so that said ring and said plate are unmovable relative to each other in the axial and radial directions of said shaft.

2. A bearing unit according to the claim 1, wherein said cover (27) has at least a pair of mutually parallel portions (32) located opposite each other across the motive power shaft and facing the engagement portions (14) of the ring (9) so that inner surfaces of tip portions of the arms (33) of the clutch releasing fork (20) can be engaged with said mutually parallel portions (32).

3. A bearing unit according to any one of claim 1 and 2, wherein said cover (27) is subjected to a wear preventive treatment including one of a TUFFTRIDE ® process and a TOUGH NITE ® process.

4. A bearing unit according to claim 2, wherein the length (d) of each of the mutually parallel portions (32) of the cover (27), which extends rectangularly across the axis of the motive power shaft, is large enough for said portions to guide the clutch releasing fork (20) on the inner surfaces of the arms (33) thereof until said arms completely go out from the engagement portions (14) of the ring (9) as said fork (20) is swung.

5. A bearing unit according to claim 2, wherein each of the ring (9) and the support plate (7) is provided with at least one relative rotation preventive engagement part (9a) in a position along the circumference of said ring in order to prevent said ring and said plate from rotating relative to each other in the circumferential direction of said ring after said ring and said plate are coupled to each other by the cover 6. A bearing unit according to the claim 5, wherein the length of the relative rotation preventive engagement part, which extends rectangularly across the axis of the motive power shaft, is smaller than that of each of the mutually parallel portions of the cover.

7. A bearing unit according to any one of claim 1 and 2, wherein the cylindrically-shaped holding portion (21) of the ring (9) has a bottom portion which confronts an end surface of said outer race, which extends in the radial direction of said ring and which is located at one end of said ring along the axis of the motive power shaft.

8. A bearing unit according to claim 1, in which said sleeve (6) and said support plate (7) are integrally formed.

9. A bearing unit according to claim 1, wherein each of the ring (9) and the support plate (7) is provided with at least one relative rotation preventive engagement part (9a) in a position along the circumference of said ring in order to prevent said ring and said plate from rotating relative to each other in the circumferential direction of said ring after said ring and said ring plate are coupled to each other by the cover.

* * * * *